3,055,926
MANUFACTURE OF ORGANIC ORTHOSILICATES
John Maclelland Pollock, Northwich, England, assignor to Imperial Chemical Industries Limited, London, England, a corporation of Great Britain
No Drawing. Filed Feb. 19, 1960, Ser. No. 9,684
Claims priority, application Great Britain Mar. 11, 1959
4 Claims. (Cl. 260—448.8)

This invention relates to a new method of making organic orthosilicates.

It is known to react silicon tetrachloride with certain alcohols, for example ethyl alcohol, to obtain the corresponding orthosilicates. Silicon tetrafluoride on the other hand, which is more conveniently and more cheaply made than silicon tetrachloride, does not react directly with alcohols in this way.

We have now discovered a method whereby silicon tetrafluoride may be made to react with primary and secondary alcohols and phenols to give organic orthosilicates.

According to our invention we provide a process for making organic orthosilicates comprising reacting silicon tetrafluoride with a primary or secondary alcohol or a phenol in the presence of a metallic sulphide under substantially moisture-free conditions.

Preferred sulphides are those of sodium and calcium, but sulphides of other metals may be used provided these metals form stable fluorides since the chemistry of the process seems to require fluorine to be fixed in the form of a stable fluoride. Using the former and ethyl alcohol, ethyl orthosilicate is obtained and the reaction may be represented by the equation $$SiF_4 + 4C_2H_5OH + 2Na_2S = Si(OC_2H_5)_4 + 4NaF + 2H_2S$$

Higher orthosilicates may be obtained by using the corresponding higher primary, secondary, or unsaturated alcohols in the process of the invention, for example n-butanol, ethyl hexanol, cyclohexanol, allyl alcohol. One convenient method of carrying out the reaction is to absorb dry silicon tetrafluoride in the dry alcohol, the silicon tetrafluoride having been made by known methods, for example by heating a mixture of silica, sodium fluoride and excess sulphuric acid. This solution is then added to a solution of anhydrous sodium sulphide in the dry alcohol or to a mixture of sulphide and alcohol, and the mixture heated for several hours at 100–150° C. Sodium fluoride is precipitated and hydrogen sulphide evolved. A stream of dry inert gas may be passed through the reaction system to sweep out hydrogen sulphide. When evolution of hydrogen sulphide has ceased the liquid is cooled, filtered to remove sodium fluoride and fractionally distilled. In another method particularly suitable for phenols that are solid at room temperature gaseous silicon tetrafluoride may be passed into a mixture of metallic sulphide and phenol heated sufficiently to melt the phenol.

The organic orthosilicates made by the process of our invention are useful owing to their readiness to hydrolyse to give silica, for example in paints for sealing porous building materials.

The following examples illustrate the invention, but are not meant to restrict its scope.

*Example 1*

110 g. ground quartz, 84 g. sodium fluoride, and 500 mls. conc. $H_2SO_4$ were heated to 180° C. in a stirred flask. The $SiF_4$ evolved (freed from HF) was bubbled into 315 mls. ethanol at room temperature, until a solution of suitable strength was obtained. The total $SiF_4$ absorbed was 64.3 g., giving a solution of 20.4% $SiF_4$ (wt./vol.). 148 mls. of this $SiF_4$ solution were added to 45 g. anhydrous sodium sulphide dissolved in 500 mls. ethanol in a stirred flask fitted with a reflux condenser. The mixture was refluxed for 15 hrs., $H_2S$ evolved being swept out of the system by a stream of dry nitrogen. The precipitated NaF was filtered off and the filtrate fractionated. Ethyl orthosilicate was collected as a clear distillate (B.P. 168–180°, 760 mms.) weighing 21.2 g.

*Example 2*

40.4 g. powdered anhydrous $Na_2S + 500$ mls. dried n-butanol were added to a one-litre three-necked flask fitted with stirrer, reflux condenser and dropping funnel. The temperature was gradually raised to 100° C. while 27 g. $SiF_4$ dissolved in n-butanol was added. The volume of $SiF_4$/butanol solution added was 160 mls. When addition of $SiF_4$ was complete the contents of the flask were maintained at 100° C. overnight and a slow stream of nitrogen bubbled through the liquid to strip out $H_2S$. When cool the mixture was filtered and the filtrate distilled at reduced pressure. After removal of unchanged n-butanol, 50 g. of a fraction boiling between 123° and 130° at 4 mms. was obtained. This was shown to be n-butyl orthosilicate by its infra-red spectrum and by the following elemental analysis.

Observed, percent: C, 59.9; H, 10.2; Si, 8.6. Calculated for $(C_4H_9O)_4Si$: C, 59.5; H, 11.25; Si, 8.75.

*Example 3*

A one-litre three-necked flask fitted with gas inlet, stirrer, and reflux condenser, was charged with 500 mls. dry phenol, and 42.2 g. powdered anhydrous sodium sulphide. The mixture was heated to 100–110° C. and $SiF_4$ was bubbled in from a weighed container. The $SiF_4$ was absorbed fairly rapidly, the exit gases consisting chiefly of $H_2S$. When 64 g. $SiF_4$ had been absorbed, dry nitrogen was passed through the mixture for 5 hours to remove $H_2S$. After filtering hot, the filtrate was distilled, giving in addition to unchanged phenol, 45 g. of a fraction boiling at 240–250 at 5½ mms. This product solidified on cooling and was recrystallised from glacial acetic acid as fine white needles. It was identified as phenyl orthosilicate from its infra-red spectrum and by the following elemental analysis.

Observed, percent: C, 71.7; H, 5.2; $SiO_2$ 16.0. Calculated for $(C_6H_5O)_4Si$: C, 72; H, 5.0; $SiO_2$, 15.0.

*Example 4*

46.9 g. dry powdered $Na_2S + 500$ mls. dry cyclohexanol were added to a one-litre three-necked flask fitted with stirrer, reflux condenser and dropping funnel, and the mixture heated to about 90° C. 247 mls. of a 12.8% solution (wt./vol.) of $SiF_4$ in dry cyclohexanol were then added slowly, and the temperature raised to 140° C. After 20 hours the mixture was filtered hot and distilled at reduced pressure. When excess cyclohexanol had been removed, 72 g. of product distilled over at 206–214° C./3 mms., collecting as a pale yellow solid in the receiver. This solid when recrystallised from hot methanol had the following analysis: C, 67.6%; H, 10.3%; $SiO_2$, 15.3%. The theoretical figures for cyclohexyl orthosilicate are: C, 67.9%; H, 10.3%; $SiO_2$, 14.1%.

*Example 5*

19.1 g. $SiF_4$ were absorbed in 200 mls. dry 2-ethyl hexanol, and the solution added during about 30 minutes to a stirred mixture of 28.7 g. powdered $Na_2S + 250$ mls. 2-ethyl hexanol at 100° C. in a three-necked one-litre flask. The temperature was maintained at 100° C. for 4 hours with a stream of dry nitrogen passing through the liquid. The contents of the flask were then filtered hot and the filtrate distilled. Unchanged 2-ethyl hexonal was first obtained as a distillate, followed by 40.3 g. of a yellow liquid boiling at 176–180° C. at 1 mm. This liquid was identified as 2-ethyl hexyl orthosilicate by its infra-red spectrum and the following elemental analysis.

Observed, percent: C, 70.1; H, 13.2; $SiO_2$, 11.0. Calculated for 2-ethyl hexyl orthosilicate: C, 70.5; H, 12.5; $SiO_2$, 11.0.

A higher boiling fraction was obtained from the distillation, boiling at about 230° C. at 1 mm. This was identified as hexa-(2-ethylhexoxy)-disiloxane by the following analysis.

Observed, percent: C, 64.3; H, 11.3; $SiO_2$, 13.8. Calculated: C, 68.0; H, 12.05; $SiO_2$, 14.2.

What I claim is:

1. A process for making organic orthosilicates comprising reacting under substantially moisture-free conditions silicon tetrafluoride with a hydroxy compound selected from the group consisting of primary and secondary alcohols and phenols in the presence of a sulphide of a metal whose fluoride is stable under the reaction conditions, said sulphide being selected from the group consisting of the sodium and calcium sulphides.

2. Process for making organic orthosilicates as claimed in claim 1 in which the reaction mixture of hydroxy compound, metal sulphide and silicon tetrafluoride is heated for several hours at a temperature between 100° and 150° C. and thereafter cooled, separated from metal fluoride and fractionally distilled to obtain the organic orthosilicate.

3. Process as claimed in claim 1 in which the sulphide is sodium sulphide.

4. Process as claimed in claim 1 in which the sulphide is calcium sulphide.

References Cited in the file of this patent

UNITED STATES PATENTS 2,814,635     Scheel et al. _____ Nov. 26, 1957

FOREIGN PATENTS 955,236     Germany _____ Jan. 3, 1957